United States Patent [19]

Kummer et al.

[11] Patent Number: 4,479,569

[45] Date of Patent: Oct. 30, 1984

[54] SPRING MEANS FOR A CLUTCH

[75] Inventors: Martin E. Kummer; William H. Sink; James K. Tarlton, all of Auburn, Ind.

[73] Assignee: Dana Corporation, Toledo, Ohio

[21] Appl. No.: 368,381

[22] Filed: Apr. 14, 1982

[51] Int. Cl.³ .................. F16D 13/52; F16D 3/12
[52] U.S. Cl. .................. 192/70.20; 192/70.19; 192/30 V; 188/71.5; 188/72.3; 188/73.38
[58] Field of Search ............ 192/70.19, 30 V, 70.28, 192/70.2; 188/71.5, 73.38, 72.3

[56] References Cited

U.S. PATENT DOCUMENTS

| 2,600,520 | 6/1952 | Spase | 192/70.28 X |
|---|---|---|---|
| 2,764,261 | 9/1956 | Bridges | 188/73.38 |
| 3,424,288 | 1/1969 | Sink | 192/70.16 |
| 3,861,501 | 1/1975 | Brooks et al. | 192/70.2 X |
| 4,081,064 | 3/1978 | Smith et al. | 192/70.13 |
| 4,181,200 | 1/1980 | Souma | 188/73.38 |
| 4,243,123 | 1/1981 | Watanabe | 192/30 V X |
| 4,333,554 | 6/1982 | Sink et al. | 192/70.19 |
| 4,342,381 | 8/1982 | Tamura | 188/73.38 |
| 4,371,060 | 2/1983 | Iwata | 188/73.38 |

FOREIGN PATENT DOCUMENTS 681145 8/1939 Fed. Rep. of Germany ... 192/70.19

Primary Examiner—Rodney H. Bonck
Assistant Examiner—David D. House
Attorney, Agent, or Firm—Emch, Schaffer & Schaub Co.

[57] ABSTRACT

A self-centering anti-rattle spring for a clutch is disclosed. The resilient spring is positioned between the circumference of a pressure plate of the clutch and the circumference of a flywheel of the clutch. The resilient spring acts to arrest vibration and tumbling of the pressure plate to reduce wear and noise encountered during clutch operation. The resilient spring also functions to align a rotatable drive member connecting the plate to the flywheel.

24 Claims, 8 Drawing Figures

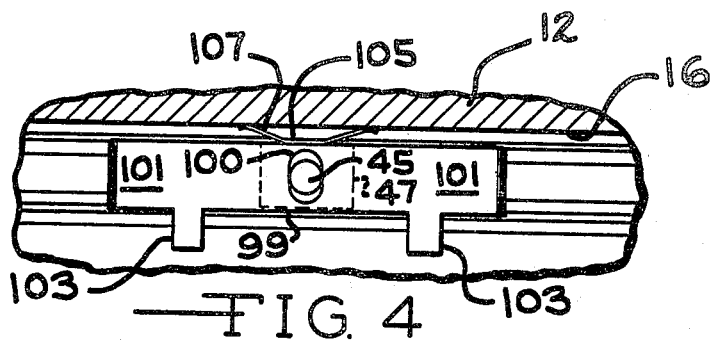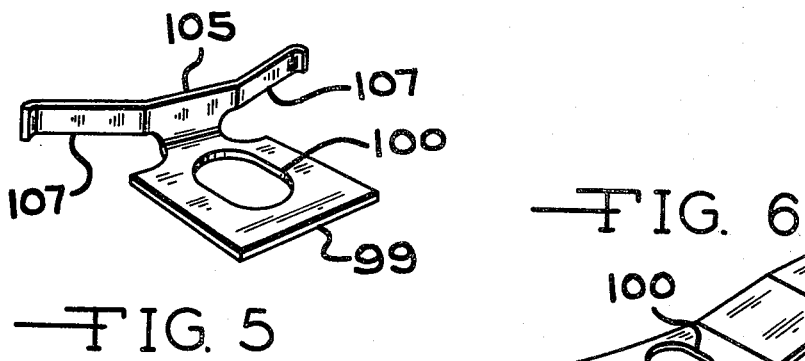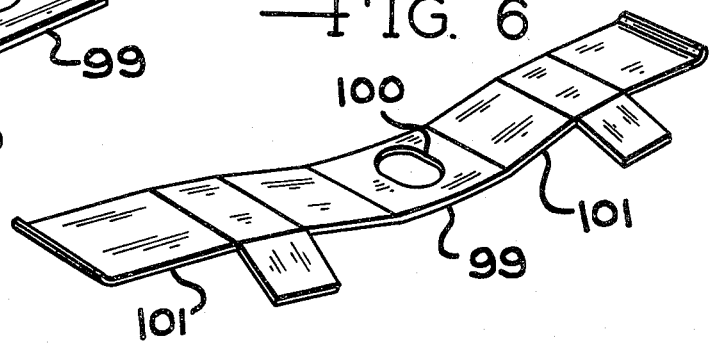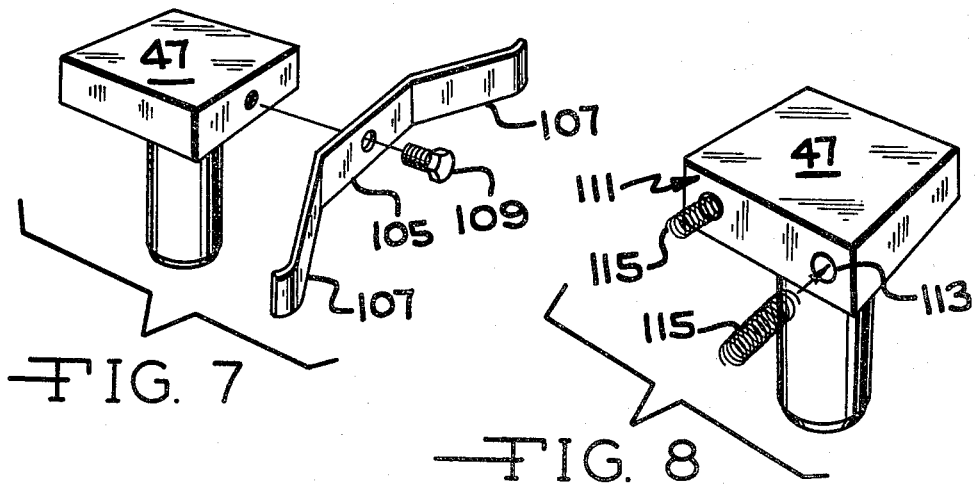

SPRING MEANS FOR A CLUTCH

BACKGROUND OF THE INVENTION

Heavy duty clutches, generally, and specifically those of the two-plate configuration, are subject to tumbling and torsional activity of their parts at idle speed and torsional activity at higher speeds when the clutch is released. In such arrangements the intermediate plate of the two-plate clutch or the pressure plate of a single-plate clutch has a tendency to tumble at slow speed and a tendency to clatter or vibrate back and forth at high speed as the edges of its drive lugs abut against the opposite edges of the drive lug slots. The first of these motions (tumbling) is caused by gravity. In this movement the lug slots on the intermediate or pressure plate seek support from horizontally opposed pairs of driving lugs, which pair of lugs constantly change relative position during rotation of the cover, imparting a tumbling motion to the intermediate or pressure plate. The second of these motions is caused by a torque loading being imposed on the intermediate plate through a non-uniform rotation of the engine, flywheel, and cover. At the same time the intermediate or pressure plate is attempting, due to inertia, to rotate uniformly. The rotational differences between the intermediate plate and the fly wheel create a torque loading on the intermediate plate. The torque loading can produce a vibratory motion in the intermediate plate that can cause the clutch to clatter.

The unwanted tumbling and vibratory motion cause a "clunking" type noise in the clutch and, additionally, subject the clutch parts to undue wear. Although wearing can be provided for fairly satisfactorily by use of strengthened structural members, recent developments in the engine field have increased the torsional vibration, causing increased wear on the driving slots. Reduction of the torsionally induced clatter reduces the wear on the driving lugs and slots.

Although various arrangements for the suppression of tumbling vibrations and rattling of clutch plates and clutch assemblies have been developed and are known to exist in the prior art, none of the known arrangements provide an extremely simple assembly which requires the use of no special mounting means and, therefore, is capable of utilizing standard clutch parts. Accordingly, it would be desirable to provide a clutch useable with the new engines that has a simply mounted vibration suppression unit to reduce the noise generated by the operation of the clutch.

In this type of heavy duty clutch the intermediate plate moves axially during the operation of the clutch, and the resulting wear. The intermediate plate is also drivingly connected to the flywheel by drive pins that engage slots in the intermediate plate. It is very important that the drive pins be properly aligned with the slots in the intermediate plate to prevent binding during the axial movement of the intermediate plate. If the drive pins and slots are not properly aligned, the intermediate plate can be restricted in axial movement. If the intermediate plate is not free to move axially, an incomplete release of the clutch and/or erratic engagement of the clutch can result.

SUMMARY OF THE INVENTION

The invention is directed to a spring means for a clutch device. The clutch has a rotatable drive member having a substantially planar face. A circular flange extends from the outer periphery of the face. A driven member is positioned adjacent the drive member. An engaging plate means is provided that is rotatable with and axially moveable relative to the drive member. The engaging plate means has a circular outer periphery containing at least one slot therein. At least one lug extends radially inwardly from the circular flange for driving engagement with the slot on the engaging plate means. A spring means, positioned adjacent the circular flange, engages the lug to maintain the lug in alignment with the slot in the engaging plate means. The spring means also engages the engaging plate means whereby the spring means reduces torsional and tumbling induced rattle in the clutch.

The invention is also directed to a spring means for a clutch as described above in which the clutch has a plurality of lugs extending from the circular flange of a drive member. Each lug includes a shaft positioned in and extending from the circular flange. A drive block, pivotally positioned on the end of the shaft, is in alignment with and in engagement with the slot in the engaging plate means. The spring means includes an attachment member that is positioned between the drive block and the circular flange. Resilient spring members extend from opposed sides of the attachment member. The spring members engage the circular flange and the engaging plate means whereby the spring means reduces torsional and tumbling induced rattle in the clutch.

The invention is further directed to a spring means for a clutch to align the pivotal drive blocks, as described above, with the slots in the engaging plate means. The spring means is in engagement with and extends from the drive block. A portion of the spring means extends from the drive block and engages the face of the drive member whereby the spring means aligns the drive block with respect to the slot in the engaging plate means.

DESCRIPTION OF THE DRAWINGS

FIG. 4 is a partial cross sectional view looking at the bottom of the spring means shown in FIG. 3.

FIG. 5 is a perspective view of another embodiment of the spring means of the present invention.

FIG. 6 is a perspective view of another embodiment of the spring means of the present invention.

FIG. 7 is an exploded perspective view of another embodiment of the spring means of the present invention. FIG. 8 is an exploded perspective view of another embodiment of the spring means of the present invention.

DESCRIPTION OF THE PREFERRED EMBODIMENT

Figure 2:
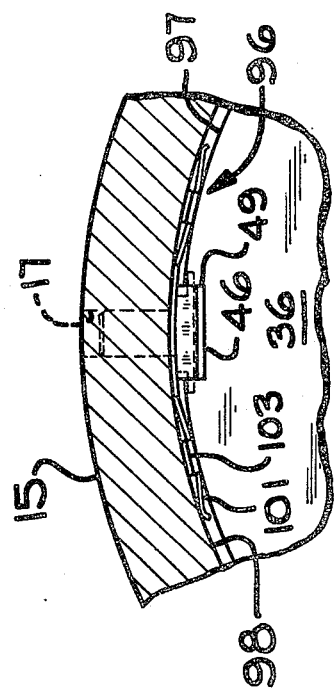
FIG. 2 is a partial cross sectional view taken along line 2—2 in FIG. 1.
Figure 3:
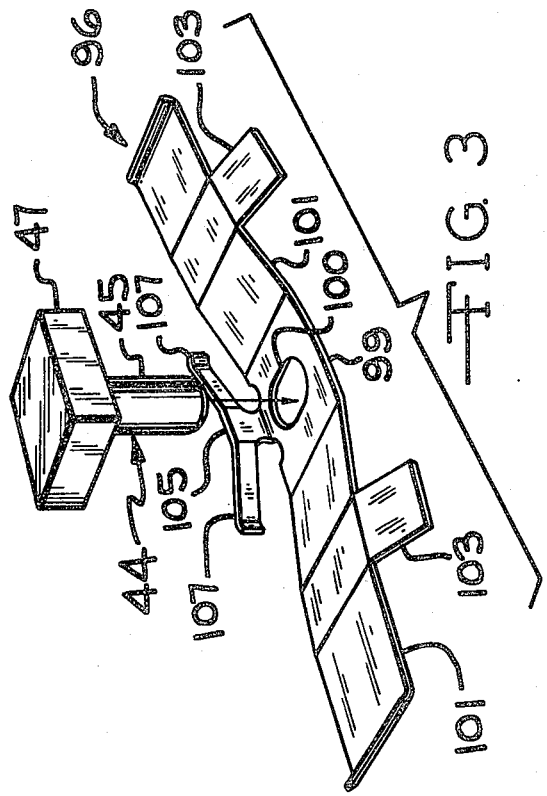
FIG. 3 is an exploded perspective view of the spring means for the clutch of the present invention.
Figure 1:
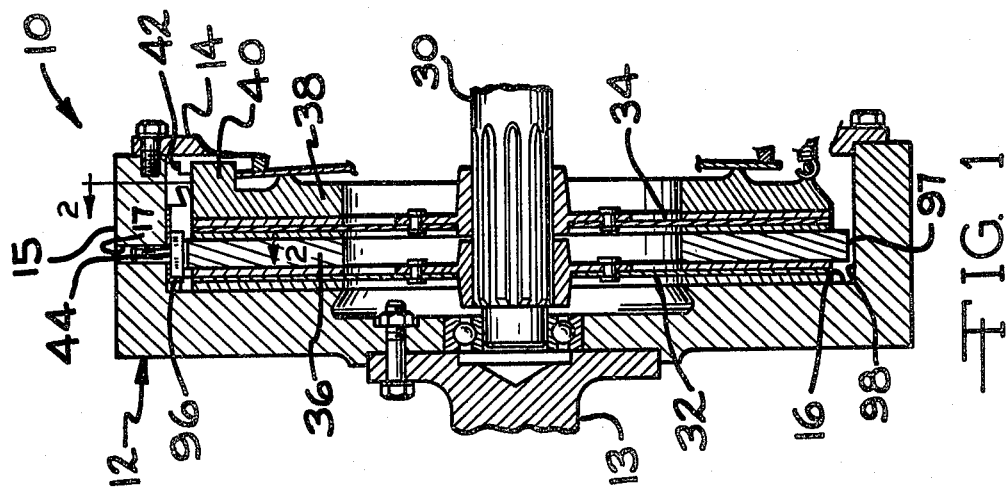
FIG. 1 is a partial cross sectional view of the clutch device of the present invention.

Referring now to the drawings for a better understanding of the invention, there is shown a spring loaded two-plate clutch 10 drivingly connected for unitary rotation with a flywheel 12. The flywheel has a substantially planar friction face 16 and a circular flange 15 that extends from the outer periphery of the friction face. The flywheel 12 is rotatably supported on a driving shaft 13 that extends from an engine or prime mover (not shown). The flange 15 extends axially from the outer periphery of the flywheel 12 in a direction away from the driving shaft 13. A clutch cover 14 is secured to the circular flange 15.

An output shaft, shown fragmentarily at 30, adapted to be clutched into a driving relationship with the flywheel 12, is piloted at its forward end in the flywheel and extends axially rearwardly therefrom through the cover 14. A pair of driven members 32 and 34 are splined for unitary rotation and relative axial movement on the forward end of shaft 30 and are adapted to be pressed into driving engagement with the flywheel 12 and a limited axially moveable intermediate plate 36 disposed there between. Movement of the driven members and the intermediate plate is controlled by an axially moveable pressure plate 38. Pressure plate 38 is drivingly connected to the cover 14 by means of a plurality of lugs 40 extending axially from the rear surface thereof into registering slots 42 formed in the cover 14. The circular flange 15 extends over and radially encompasses the driven members, the intermediate plate and the pressure plate. The intermediate plate 36 is drivingly connected to the flywheel by means of a plurality of drive pins 44 extending radially from the circular flange 15 of the flywheel 12. The drive pins 44 extend from the circular flange in a direction towards the intermediate plate and are disposed for registering in drive slots 46 formed on the outer periphery of the intermediate plate 36. The drive slots 46 are positioned axially in the intermediate plate and the sidewalls 49 of the drive slots are substantially perpendicular to the friction face 16 of the flywheel 12.

The intermediate plate 36 is drivingly coupled to the flywheel 12 by the drive pins 44 which engage the drive slots 46. The intermediate plate is drivingly coupled with the output shaft 30 when the driven members 32 and 34 are moved into frictional engagement with the flywheel and the intermediate plate. During the clutching and declutching of the clutch 10, the intermediate plate 36 moves axially approximately thirty to forty thousandths of an inch.

The drive pins 44 comprise a shank or pin 45 that is securely positioned in an aperture 17 in the circular flange 15 of the flywheel. One end of the shank extends from the circular flange in a direction towards the intermediate plate 36. A drive block 47 is pivotally positioned on the end of the shank that extends from the circular flange. The drive block 47 is preferably rectilinearly shaped to bear against the sidewalls 49 of the rectilinear slots 46. A friction material can be placed on or against the portion of the shank 45 where the drive block 47 is positioned to assist in maintaining the drive block in the proper position during assembly of the clutch 10.

The mechanism for engaging and disengaging the clutch devices is substantially the same as that described in U.S. Pat. No. 3,424,288 granted to William H. Sink on Jan. 28, 1969. As the mechanism for operating the clutch device is described in detail in this earlier patent, that description will not be repeated herein. However, the disclosure of the above patent is hereby incorporated by reference into the specification of the present patent application.

Because of the torque loading imposed on the intermediate plate 36, a clutch constructed as herein described suffers from the before mentioned clattering noise and consequently results in an increase in wear on the moving parts. To prevent the above difficulties, a plurality of spring means 96 are positioned between the inner periphery 98 of the circular flange 15 of the flywheel and the outer periphery 97 of the intermediate plate 36.

The spring means 96 includes a substantially flat attachment member 99 that is positioned between the drive pin 44 and the inner periphery 98 of the circular flange 15 of the flywheel. The attachment member contains an aperture 100 that is disposed for being positioned on the shank 45 that connects to the drive block 47 of the drive pin 44. The positioning of the shank 45 through the aperture 100 acts to secure the attachment member in position with respect to the drive block 47 and inner periphery 98 of the circular flange 15. The attachment member 99 is normally larger than the drive block and the attachment member thereby provides a wear surface between the drive block 47 and the circular flange 15.

Extending from opposed sides of the attachment member 99 are substantially flat spring members 101. The spring members are formed of a spring steel and extend from the attachment member in a direction along the outer periphery of the intermediate plate 36. The spring members and attachment member are normally wider than the intermediate plate and extend from each side of said intermediate plate. The spring members have an arcuate shape with the portion of the spring members adjacent the attachment member 99 being in contact with the inner periphery 98 of the circular flange 15. The ends of the spring members that are spaced apart from the attachment member 99 are also in contact with the inner periphery 98 of the circular flange. The spring members 101 are in contact with the outer periphery of the intermediate plate 36 at a point that is substantially mid way between the ends of the spring members.

The spring members 101 resiliently engage the intermediate plate 36. Although any number of spring means 96 can be utilized in the present invention there is usually a spring means associated with each drive pin 44. Normally, the drive pin 44 and drive slots 46 are uniformly spaced around the outer periphery of the intermediate plate 36. Thus, the spring members 101 of the spring means 96 act to resiliently center the intermediate plate 36 relative to the circular flange 15 of the flywheel. As the spring members 101 are wider than the intermediate plate 36, the spring members will remain in resilient engagement with the intermediate plate as the intermediate plate moves axially with respect to the shaft 30. It should be noted, however, that the spring force of the spring members 101 against the intermediate plate 36 is insufficient to prevent disengagement of the clutch 10.

Positioned on each of the spring members 101 is a resilient flange 103. The flanges extend from the side of the spring members that are spaced apart, and in a direction away from the face 16 of the flywheel 12. As the flanges extend away from the spring members 101 the flanges generally converge towards the circular flange 15 of the flywheel. The flanges assist in positioning the intermediate plate 36 in the clutch 10. During the assembly of the clutch the spring means 96 and drive pins 44 are positioned in the circular flange 15 of the flywheel 12 prior to positioning the intermediate plate in the clutch 10. As the intermediate plate 36 is moved axially into the proper position the outer periphery of the intermediate plate contacts the end of the flanges 103 that are spaced apart from the spring members 101. As the ends of the flanges converge towards the circular flange the outer periphery of the intermediate plate can be positioned against the ends of the flanges. As the intermediate plate is moved axially towards the flywheel, the intermediate plate bears against and displaces the resilient flanges toward the circular flange 15. Since the flanges 103 are connected to the spring member 101, the spring members will also be displaced towards the circular flange 15 by any radial movement of the intermediate plate. The flanges 103 are located substantially at the midpoint of the spring member which is also substantially the point at which the spring member engages the intermediate plate. In this manner, the flanges 103 provide a mechanism whereby the spring members can be radially displaced as the intermediate plate 36 is moved axially into the proper position in the clutch 10. When the intermediate plate is in the proper position the spring members 101 will be in resilient contact with the intermediate plate.

On one side of the attachment member 99 there is a base section 105 that extends from the attachment member in a direction substantially perpendicular to the attachment member. The base section extends from the attachment member in a direction towards the intermediate plate 36. The base section 105 is substantially the same width as the side of the drive block 47 and the base section is disposed for contact with one side of the drive block. Defining a portion of the base section 105 are leaf springs 107. The leaf springs extend from the base section 105 in a direction toward the face 16 of the flywheel 12. The leaf springs 107 are disposed for engaging the face 16 of the flywheel and for resiliently biasing the base section 105 against the side of the drive block 47. The leaf springs 107 are disposed to engage the face 16 in a manner to maintain the base section 105 substantially parallel to the face. The engagement of the base section with the drive block maintains the drive block in proper alignment with the slot 46 in the outer periphery of the intermediate plate 36. The drive block is in proper alignment when the sides of the drive block that are adjacent the sidewalls of the slots are in substantially parallel relationship with the sidewalls of the slot. This orientation of the drive block with respect to the slot reduces any binding that can occur between the drive block and slot as the intermediate plate moves in an axial direction during the operation of the clutch. The leaf springs 107 and base section 105 also provide enough force against the side of the drive block to urge or wedge the drive block 47 against the pin 45 upon which the drive block is pivotally mounted. The urging of the drive block against the pin acts to hold the drive block in position on the pin.

The operation of the clutch 10, including the spring means 96 will now be explained in greater detail. When the engine is in an idle condition, tumbling of the intermediate plate 36 can occur. This tumbling is resisted by the spring members 101 that extend from the attachment member 99 of the spring means 96. The spring members 101 engage the inner periphery 98 of the circular flange 15 of the flywheel 12 and the outer periphery of the intermediate plate 36. The spring members 101 resiliently engage the intermediate plate 36 and act to center the intermediate plate with respect to the circular flange 15. As the intermediate plate 36 is centered with respect to the circular flange 15, the intermediate plate is much less susceptible to gravitational forces that result in tumbling. Accordingly, the spring means 96 effectively reduces or eliminates the objectionable tumbling of the intermediate plate when the engine is idling. At the same time, the spring members 101 resiliently bear against the intermediate plate 36 and the circular flange 15 of the flywheel 12 to reduce or eliminate torsional vibration or rattle between the drive pins 44 and drive slots 46. When the engine speed is increased substantially above idle conditions (approximately to 1100 r.p.m) centrifugal force on the intermediate plate 36 tends to prevent tumbling. The spring members 101 of the spring means 96 then function to provide resilient engagement between the circular flange 15 and intermediate plate 36 to prevent torsional caused vibration or clattering.

During the operation of the clutch, the intermediate plate 36 moves axially with respect to the output shaft 30 as the clutch is engaged and disengaged. During the axial movement of the intermediate plate 36 the drive slots 46 move with respect to the drive blocks 47. It is desirable to maintain the drive blocks in alignment with the sidewalls of the drive slots to prevent binding between the drive blocks 47 and the drive slots 46 during the axial movement of the intermediate plate 36. To prevent this binding, the base section 105 is positioned against one face of the drive block, and the leaf springs 107 extend from the base section to engage the face 16 of the flywheel 12. The leaf springs 107, by engaging the face of the flywheel, maintain the base section 105 in an orientation that is substantially parallel to the face of the flywheel. Since the base section 105 is held in engagement against one face of the rectilinear drive block 47, the face of the drive block will also be maintained in a substantially parallel relationship to the face 16 of the flywheel. With one face of the rectilinear drive block parallel to the face 16 of the flywheel, the sides of the drive block that are adjacent the sides 49 of the drive slots 46 are maintained substantially parallel to the sides of the drive slots 46. Accordingly, the base section 105 and leaf springs 107 act to maintain the drive block in alignment with the drive slot and to reduce any binding that might occur between the drive block and the drive slots 46 during axial movement of the intermediate plate 36.

During the operation of the clutch 10, the drive block 47 can sometimes come into contact with the circular flange 15 of the flywheel 12. The drive block is normally constructed of a very hard material such as steel to reduce wear between the drive block and the drive slots 46 in the intermediate plate. However, the circular flange 15 of the flywheel is normally constructed of a relatively soft material such as cast iron. Accordingly, contact between the drive blocks 47 and the circular flange 15 can have a very damaging result on the circular flange. The attachment member 99 of the spring means 96 is positioned between the drive blocks 47 and the circular flange 15. The attachment member, therefore, provides a wear surface that prevents engagement between the drive blocks and the circular flange. This wear surface prevents damage from resulting to the circular flange due to contact between the drive block and the circular flange. If, during the replacement of the clutch 10, there appears to be a sufficient degree of wearing on the attachment member 99 from contact with the drive blocks 47, the attachment members can be easily replaced during the replacement of the clutch. The attachment members 99 are also much easier and cheaper to replace than replacing a flywheel 12 having a damaged circular flange 15. In addition, it is possible to construct the attachment members 99 of a material that can more easily handle the wear induced by contact with the drive block than the soft cast iron of the circular flange 15 of the flywheel 12.

Although the spring means 96 has been described in detail, it should be understood that it is not always necessary to use the entire spring means in all applications. As shown in FIG. 6, it is possible to use only the attachment member 99 and the spring members 101 in the clutch 10. In this embodiment the attachment member is secured in position by the pin 45 that extends through the aperture 100 in the attachment member 99. The spring members 101 extend from the attachment member as previously described and engage the outer periphery of the intermediate plate 36. The spring members 101 resiliently engage the intermediate plate 36 and center the intermediate plate relative to the circular flange 15 of the flywheel 12, to reduce or eliminate tumbling and torsional vibration of the intermediate plate.

FIG. 5, shows another embodiment of the invention where the attachment member 99, base section 105 and leaf springs 107 are utilized as described above. However, in this embodiment the spring members 101 are not utilized. In this embodiment the attachment member 99 is again secured in position by the pin 45 which extends through the aperture 100 in the attachment member. The attachment member is positioned between the drive block 47 and the inner periphery 98 of the circular flange 15. In this embodiment the leaf springs 107 and base section 105 function to align the drive block 47 in the drive slot 46 as previously described. In addition, the attachment member 99 provides a wear surface between the drive block and the inner periphery 98 of the circular flange 15.

FIG. 7 shows a further embodiment of the invention where only the base section 105 and leaf springs 107 of the spring means 96 are utilized in the clutch 10. In this embodiment the base section 105 is secured to one face of the drive block 47. The base section is normally connected to the face of the drive block by a rivet 109. However, it should be understood that other suitable attachment means can be utilized. In this embodiment the base section 105 and leaf springs 107 function as previously described to align the drive block. However, the component parts of the spring means 96 have been reduced by eliminating the attachment member 99 and spring members 101 and attaching the base section 105 directly to a face of the drive block.

FIG. 8 shows an additional embodiment where one side 111 of a drive block 47 contains two apertures 113. Two resilient spring means 115 are positioned in and extend from the aperture in the side 111 of the drive block. The spring means extend from the side 111 in a direction that is substantially perpendicular to the side. The spring means are disposed to resiliently engage the face 16 of the flywheel 12 to maintain the side 111 of the drive block in substantially parallel relationship with the face 16 of the flywheel. In this position the drive block is in proper alignment with the slot 46 in the intermediate plate 36. Thus, the embodiment shown in FIG. 8 provides another means for aligning the drive block with respect to the drive slot to reduce any binding that might occur during the axial movement of the intermediate plate.

Having described the invention in detail with reference to the drawings, it is understood that such specifications are given for the sake of explanation. Various modifications and substitutions, other than those cited, can be made without departing from the scope of the invention as defined in the following claims.

I claim:

1. A clutch device comprising:
    a rotatable drive member having a substantially planar face and a circular flange extending from the outer periphery of said face;
    a driven member;
    an engaging plate means rotatable with and axially moveable relative to said drive and driven members, said engaging plate means having a circular outer periphery containing at least one slot therein, said slot being substantially rectilinear and sidewalls of said slot being substantially perpendicular to said face of said drive member;
    at least one lug extending from said circular flange of said drive member, said lug containing a shaft positioned in and extending from said circular flange and a drive block pivotally positioned on said shaft, said drive block having a substantially rectilinear shape for alignment in said slot in said engaging plate means, said lug being disposed for engagement with said slot on said engaging plate means; and
    spring means positioned adjacent said circular flange, said spring means engaging one side of said substantially rectilinear drive block of said lug and said face of said drive member to align and maintain said drive block of said lug in alignment with said slot, said spring means resiliently engaging said engaging plate means whereby said spring means reduces torsional and tumbling induced rattle in said clutch.

2. The clutch device of claim 1 wherein a plurality of drive lugs extend from said circular flange and said engaging plate means contains a plurality of slots for receiving said drive lugs.

3. The clutch device of claim 1 wherein said spring means is a leaf spring having a base section that extends along one side of said drive block and two end sections that extend from said base away from said drive block for engaging said face of said drive member.

4. The clutch device of claim 3 wherein said leaf spring is secured directly to one side of said drive block.

5. The clutch device of claim 4 wherein said base of said leaf spring is riveted to one side of said drive block.

6. The clutch device of claim 3 wherein said base of said leaf spring is connected to an attachment member, said attachment member is positioned substantially perpendicular to said base, said attachment member containing an aperture.

7. A clutch device comprising:
    a rotatable drive member having a substantially planar face and a circular flange extending from the outer periphery of said face;
    a driven member;
    an engaging plate means rotatable with and axially moveable relative to said drive and driven members, said engaging plate means having a circular outer periphery containing a plurality of equally spaced slots therein;
    a plurality of lugs extending from said circular flange of said drive member, said lugs including a shaft positioned in and extending from said circular flange and a drive block pivotally positioned on an end of said shaft that extends from said circular flange, said drive blocks of said lugs being in alignment with and in engagement with said slots on said engaging plate means; and spring means having an attachment member positioned between said drive block and said circular flange, said attachment member containing an aperture, said shaft of said lug passing through said aperture in said attachment member whereby said shaft maintains said spring means in position in said clutch device, said spring means also including resilient spring members extending from opposed sides of said attachment member, said resilient spring members engaging said circular flange and said outer periphery of said engaging plate means whereby said spring members reduce torsional and tumbling induced rattle in said clutch device.

8. The clutch device of claim 7 wherein said spring members have an arcuate shape, the portion of said spring members adjacent said attachment member being in contact with said circular flange, said spring members being in contact with said outer periphery of said engaging plate means at substantially the midpoint of said spring members and said ends of said spring members that are spaced apart from said attachment member being in contact with said circular flange.

9. The clutch device of claim 8 wherein each of said spring members include flanges that extend from substantially the midpoint of said spring members, said flanges extending from said members in a direction away from said circular flange of said drive member as said flanges extend from said spring members.

10. The clutch device of claim 7 wherein said clutch device contains two driven members and said engaging plate means is positioned between driven members.

11. A clutch device comprising:
a rotatable drive member having a substantially planar face and a circular flange extending from the outer periphery of said face;
a driven member;
an engaging plate means rotatable with and axially moveable relative to the drive and driven members, said engaging plate means having a circular outer periphery containing a plurality of equally spaced slots therein, said slots being substantially rectilinear and sidewalls of said slot being substantially perpendicular to said face of side drive member;
a plurality of lugs extending from said circular flange of said drive member, said lugs containing a shaft extending from said circular flange and a drive block pivotally mounted on a portion of said shaft that extends from said circular flange, said drive block having a substantially rectilinear shape, said lugs being in alignment with said slots on said engaging plate means, said pivotable drive blocks being positioned in said slots; and
spring means in engagement with and extending from said drive block, a portion of said spring means extending from said drive block and engaging said face of said drive member, whereby said spring means aligns said drive block with respect to said slot in said engaging plate means.

12. The clutch device of claim 11 wherein said spring means engages one side of said substantially rectilinear drive block and said face of said drive member to align said drive block in said slot in said engaging plate.

13. The clutch device of claim 12 wherein said spring means is a leaf spring having a base section that extends along one side of said drive block and two end sections that extend from said base away from said drive block for engaging said face of said drive member.

14. The clutch device of claim 13 wherein said leaf spring is secured directly to one side of said drive block.

15. The clutch device of claim 13 wherein said base of said leaf spring is connected to an attachment member, said attachment member is positioned substantially perpendicular to said base, said attachment member containing an aperture.

16. The clutch device of claim 15 wherein said attachment member is positioned between said drive block and said circular flange on said drive member, said shaft of said drive lug passing through said aperture in said attachment member to secure said attachment member in position with respect to said drive block, said aperture disposed to position said base of said leaf spring against one side of said drive block and to dispose said end sections for engagement with said face of said drive member.

17. A clutch device comprising:
a rotatable drive member having a substantially planar face and a circular flange extending from the outer periphery of said face;
a driven member;
an engaging plate means rotatable with and axially moveable relative to said drive and driven members, said engaging plate means having a circular outer periphery containing at least one slot therein;
at least one lug extending from said circular flange of said drive member, said lug being disposed for engagement with said slot on said engaging plate means; said lug contains a shaft positioned in and extending from said circular flange and a drive block pivotally positioned on said shaft, said slot in said engaging plate means is substantially rectilinear and sidewalls of said slot are substantially perpendicular to said face of said drive member, said drive block having a substantially rectilinear shape for alignment in said slot in said engaging plate means;
a spring means positioned adjacent said circular flange, said spring means engaging one side of said substantially rectilinear drive block and said face of said drive member to align said drive block in said slot in engaging plate means;
said spring means being a leaf spring having a base section that extends along one side of said drive block and two end sections that extend from said base away from said drive block for engaging said face of said drive member;
said base of said leaf spring being connected to an attachment member, said attachment member being positioned substantially perpendicular to said base, said attachment member containing an aperture, said attachment member being positioned between said drive block and said circular flange on said drive member, said shaft of said drive lug passing through said aperture in said attachment member to secure said attachment member in position with respect to said drive block, said aperture disposed to position said base of said leaf spring against one side of said drive block and to dispose said end sections for engagement with said face of said drive member, said attachment member acting as a wear surface between said circular flange and said drive block, whereby said spring means reduces torsional and tumbling induced rattle in said clutch.

18. The clutch device of claim 17 wherein resilient spring members extend from opposed sides of said attachment member, said spring members extending between said circular flange and said outer periphery of said engaging plate means, said spring members engaging said circular flange and said outer periphery of said engaging plate means whereby said spring members are biased against said engaging plate means to reduce torsional and tumbling induced rattle in said clutch device.

19. The clutch device of claim 18 wherein said spring members have an arcuate shape, the portion of said spring members adjacent said attachment member being in contact with said circular flange, said spring members being in contact with said outer periphery of said engaging plate means at substantially the midpoint of said spring members and said ends of said spring members that are spaced apart from said attachment member being in contact with said circular flange.

20. The clutch device of claim 19 wherein each of said spring members include flanges that extend from substantially the midpoint of said spring members in a direction away from said face of said drive member, said flanges converting towards said circular flange of said drive member as said flanges extend from said spring members.

21. A clutch comprising:
a rotatable drive member having a substantially planar face and a circular flange extending from the outer periphery of said face;
a pair of driven members disposed for axial movement relative to said drive member;
an engaging plate means positioned between said drive members, said engaging plate means rotatable with and axially moveable relative to said drive member, said engaging plate means having a circular outer periphery containing a plurality of equally spaced substantially rectilinear slots therein;
a plurality of lugs extending from said circular flange of said drive member, said lugs including a shaft positioned in and extending from said circular flange and a substantially rectilinear drive block pivotally positioned on said end of said shaft that extends from said circular flange, said drive blocks of said lugs being in alignment with and in engagement with said slots on said engaging plate means;
a plurality of substantially flat attachment members positioned between said drive blocks and said circular flange, each said attachment member containing an aperture, said shaft of said lug passing into said drive block and said circular flange, said attachment member providing a wear surface between said drive block and said circular flange;
resilient spring members extending from opposed sides of said attachment members, said spring members extending radially around said circular flange, said spring members resiliently engaging said circular flange and said engaging plate means whereby said spring members act to center said engaging plate means with respect to said circular flange and to reduce torsional and tumbling induced rattle in said clutch;
a leaf spring connected to said attachment members, said leaf spring having a base section that extends from said attachment member towards said plate engaging means, said base section disposed for engaging one side of said rectilinear drive block, said leaf spring containing two resilient end sections that extend from said base section, said end sections being disposed for resiliently engaging said face of said drive member, said end sections being disposed to maintain said base section in resilient engagement with one face of said drive block whereby sides of said rectilinear drive block that are positioned adjacent sidewalls of said rectilinear slots are substantially parallel to said sidewalls of said slots to reduce binding between said drive blocks and said slots during axial movement of said plate engaging means.

22. A clutch device comprising;
a rotatable drive member having a substantially planar face and a circular flange extending from the outer periphery of said face;
a driven member;
an engaging plate means rotatable with and axially moveable relative to said drive and driven members, said engaging plate means having a circular outer periphery containing at least one slot therein;
at least one lug extending from said circular flange of said drive member, said lug being disposed for engagement with said slot on said engaging plate means; said drive lug containing a shaft positioned in and extending from said circular flange and a drive block pivotally positioned on said shaft, said slot in said engaging plate means is substantially rectilinear and sidewalls of said slot are substantially perpendicular to said face of said drive member, said drive block having a substantially rectilinear shape for alignment in said slot in said engaging plate means; and
spring means positioned adjacent said circular flange, said spring means engaging one side of said substantially rectilinear drive block and said face of said drive member to align said drive block in said slot in said engaging plate means, said spring means acting to bias said drive block away from said face of said drive member whereby said drive block is wedgingly secured to said shaft, and whereby said spring means reduces torsional and tumbling induced rattle in said clutch.

23. A clutch device comprising:
a rotatable drive member having a substantially planar face and a circular flange extending from the outer periphery of said face;
a driven member;
an engaging plate means rotatable with and axially moveable relative to said drive and driven members, said engaging plate means having a circular outer periphery containing at least one slot therein;
at least one lug extending from said circular flange of said drive member, said lug being disposed for engagement with said slot on said engaging plate means; said drive lug contains a shaft positioned in and extending from said circular flange and a drive block pivotally positioned on said shaft, said slot in said engaging plate means is substantially rectilinear and sidewalls of said slot are substantially perpendicular to said face of said drive member, said drive block having a substantially rectilinear shape for alignment in said slot in said engaging plate means; and
spring means positioned adjacent said circular flange, said spring means engaging one side of said substantially rectilinear drive block and said face of said drive member to align said drive block in said slot in said engaging plate means; said spring means comprises at least two coil springs that extend from one side of said drive block to said face of said drive member, whereby said spring means reduces torsional and tumbling induced rattle in said clutch.

24. A clutch device comprising:

a rotatable drive member having a substantially planar face and a circular flange extending from the outer periphery of said face;

a driven member;

an engaging plate means rotatable with and axially moveable relative to the drive and driven members, said engaging plate means having a circular outer periphery containing a plurality of equally spaced slots therein;

a plurality of lugs extending from said circular flange of said drive member, said lugs containing a shaft extending from said circular flange and a drive block pivotally mounted on said portion of said shaft that extends from said circular flange, said drive block having a substantially rectilinear shape and said slot in said engaging plate means being substantially rectilinear, and said sidewalls of said slot being substantially perpendicular to said face of said drive member, said lugs being in alignment with said slots on said engaging plate means, said pivotable drive blocks being positioned in said slots; and spring means in engagement with one side of said substantially rectilinear drive block and said face of said drive member, said spring means extending from said drive block, a portion of said spring means extending from said drive block and engaging said face of said drive member, said spring means acting to bias said drive block away from said face of said drive member whereby said drive block is wedgingly secured to said shaft and whereby said spring means aligns said drive block with respect to said slot in said engaging plate means.

* * * * *